United States Patent [19]
Murch

[11] 3,920,608
[45] Nov. 18, 1975

[54] FIRE RETARDANT POLYESTER RESINS

[75] Inventor: Robert M. Murch, Ashton, Md.

[73] Assignee: The United States of America as represented by the Secretary of the Navy, Washington, D.C.

[22] Filed: June 19, 1974

[21] Appl. No.: 480,913

[52] U.S. Cl.. 260/45.9 NP; 260/45.8 R; 260/927 N; 260/972
[51] Int. Cl.² ............................................ C08G 6/00
[58] Field of Search ........ 260/45.9 NP, 927 N, 972, 260/45.8 R; 106/15 FP

[56] References Cited
UNITED STATES PATENTS

| | | | |
|---|---|---|---|
| 3,083,222 | 3/1963 | Binder et al. | 260/927 |
| 3,583,938 | 6/1971 | Okada et al. | 260/45.9 |
| 3,650,820 | 3/1972 | DiPietro et al. | 106/15 |
| 3,658,634 | 4/1972 | Yanagi et al. | 260/45.9 |
| 3,669,725 | 6/1972 | Nachbur et al. | 106/15 |
| 3,745,197 | 7/1973 | Toy et al. | 260/540 |
| 3,830,886 | 8/1974 | Davis et al. | 260/45.7 |

*Primary Examiner*—V. P. Hoke
*Attorney, Agent, or Firm*—R. S. Sciascia; Arthur L. Branning; Thomas McDonnell

[57] ABSTRACT

The adduct from phosphorus pentachloride and aniline or allylamine when derivatized with an alcohol yields a reaction product that is useful as an additive for enhancing the fire retardant characteristics of general purpose polyester resins.

10 Claims, No Drawings

FIRE RETARDANT POLYESTER RESINS

BACKGROUND OF THE INVENTION

General purpose polyester resins can be used for most types of molding and laminating. By polyester is meant the polycondensation product of dicarboxylic acids with dihydroxy alcohols in contradistinction to materials known as alkyds. These polyester compounds may be modified by mono-carboxylic acids, monohydroxy alcohols and small amounts of polycarboxylic acids or polyhydroxy alcohols. Such compounds have a wide range of properties and a particular resin may have properties that may make it suitable for one purpose but unsuitable for another. For example, high viscosity resins are useful in vertical layup, where low viscosity resins, however, would be required when rapid penetration was desirable.

The wide range of properties possible with polyester resins leads to a variety of applications. They can be used as the primary polymer in fiber reinforced laminates and as the binder in composites containing a variety of inert fillers. Castings, potting compounds, cements, sealing and patching compounds, rigid and flexible coatings and adhesives can be based on polyester resins. As distinct from saturated polyesters, the resins contain olefins which produce the highly cross-linked structure generally known as a thermoset polymer.

While the uses of general purpose polyester resins continue to steadily grow, such resins suffer from the drawback that due to their high hydrogen and carbon content they continue to burn fairly readily once ignited. Since much concern has been generated by consumers to reduce the flammability of products such as flammable fabrics, manufacturers have had to find ways to reduce the flammability of polyesters and polyester resins.

The flammability of polyester resins can be reduced in several ways. These include chemical modification of one or more of the resin components, addition of organic fire retardants or addition of inorganic fillers and fire retardants.

A common chemical modification is replacing the diacid with a diacid containing halogen. Tetrachlorophthalic and tetrabromophthalic anhydrides are commonly used. One of the most widely used anhydrides is chlorendic anhydride, made by the Diels-Alder addition of hexachlorocyclopentadiene to maleic acid.

Other common polymer modifications include post bromination of the resin and the use of brominated diols. Halogenated styrene has been used and there are numerous known examples of the attachment of phosphorus-containing moieties to the diols, diacids or crosslinking olefins.

Two main types of organic compounds are commonly used as soluble, non-reactive additives. Halogen-containing aliphatic or aromatic compounds are commonly cited. Phosphorus compounds such as triethylphosphate are also well known in the art. Currently the combination of the two, i.e., tris-$\beta$-chloroethylphosphate or 2,3-dibromopropyl phosphate have been widely used. In all of these cases the amount of additive is limited by possible plasticizing effects. Even small amounts of organometallics, examples being ferocene or ferocene derivatives have been recommended as desirable additives.

A number of inorganic additives are commonly added. Of course, glass fibers or cloth are used to increase the strength of the resin, but this may or may not help the flammability. The use of inert fillers such as calcium carbonate, magnesium oxide, etc. usually help the flammability characteristics in a minor way. The addition of hydrated salts and oxides, aluminatrihydrate being the most widely used, are effective by acting as a heat sink that slows down the energy transfer to the polymer. Antimony oxide is used, usually in conjunction with halogens, the latter may be incorporated as part of the resin or as a separate additive. Another commonly used inorganic additive is zinc borate.

Thus, while the techniques used to reduce the flammability of polyester resins do so to some extent, all suffer from some drawback.

SUMMARY OF THE INVENTION

It is therefore an object of the present invention to provide general purpose polyester resins having low flammability characteristics.

Another object of the invention is to provide an additive which when added to general purpose polyester resins will enhance the fire retardancy of those resins.

Another object of the invention is to provide a method for enhancing the fire retardancy of polyester resins.

And another object of the invention is to provide a fire retardant additive to general purpose polyester resins which is cheap and readily available.

Yet another object of the present invention is to provide a fire retardant additive to general purpose polyester resins which gives minimum interference with the properties of the resin.

And yet another object of the invention is to provide a general purpose polyester resin having a low flammability without having a reduced outside durability.

These and other objects are achieved by reacting the adduct of phosphorus pentachloride and aniline or allyamine with an alcohol thereby producing an alkoxy derivative capable of enhancing the fire retardancy of polyester resins.

DETAILED DESCRIPTION

In accordance with the novel aspects of the invention, general purpose polyester resins are rendered fire retardant by adding thereto an alkoxy derivative. By "fire retardant" is meant that the resin is resistant to flame after the igniting flame has been removed. In other words the fire retardant polyester resins will not support combustion by itself. When in contact with an open flame, however, it may become charred.

Generally, polyesters are formed by the reaction of a dibasic acid with a polyhydric alcohol, such as, ethylene gycol. If either the acid or the alcohol is unsaturated, an unsaturated polyester is obtained that is capable of subsequent cross-linking either directly to similar unsaturated double bonds in adjacent polyester chains of the same structure or through an unsaturated double bond in a monomer such as styrene. An example of the latter is poly (propylene maleate/phthalate) in styrene which has long been used as a guide to compare with other more complex polyester resins. It is produced by reacting 2 moles of prophlene glycol, 1 mole of phthalic anhydride, 1 mole of maleic anhydride, hydroquinone equal to 0.2% by volume of the final solution, and monomer styrene equaling 35% by volume of the final solution. In the examples hereinafter presented poly (propylene maleate/phthalate) in styrene was used to test the ability of the additive to render polyester resins fire retardant.

The fire retardancy enhancing additives of this invention are best produced by either reacting equimolar amounts of phosphorus pentachloride and allyamine to produce allyltrichlorophosphineimine or by reacting equimolar amounts of aniline and phosphorus pentachloride. Both reactions are carried out in benzene.

After the adduction reaction is completed, an alcohol in an alcohol-to-$PCl_5$ mole ratio of 3:1 and pyridine in a pyridine-to-$PCl_5$ mole ratio of 3:1 are introduced into the solution. Isolation of the product is achieved by filtering the byproduct pyridine hydrochloride and by evaporating the solvent.

The reaction equations for the additives are $CH_2 = CHCH_2 - NH_2 + PCl_5 \longrightarrow Cl_3P = NCH_2CH = CH_2$ and $2PCl_5 + 2C_6H_5NH_2 \longrightarrow [Cl_3PNC_6H_5]_2$. The product of aniline and phosphorus pentachloride is a dimer

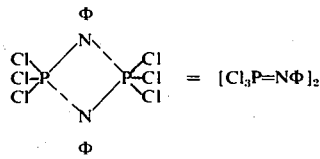

Upon the addition of certain alcohols, the alkoxy derivative would be $[(RO)_3PN\phi]_2$ but it is believed that this derivative would rearrange to give

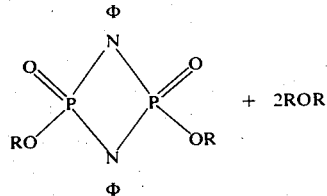

where R is the base of the alcohol added.

Alcohols found useful are β-chloroethanol, 3,3,3-trichloropropanol, 1,3-dichloro-2-propanol, 2,3-dibromopropanol, methanol, ethanol and 2,2,2-trichloroethanol. It is expected that a good many alcohols will yield similar results.

The fire retardancy of a general purpose polyesters is increased with the alkoxy derivatives of the present invention by admixing an alkoxy derivative of this invention with the polyester in an amount from about 5 to about 20 weight percent of the total mixture. Inclusion of the additive is made after the polyester is prepared, but before it is cured.

As stated previously, polyester resins may be cross-linked either directly or through an unsaturated monomer. When cross-linked quite often a catalyst is used. Among the catalysts useful for such purposes are the peroxides. Some decompose at high temperatures, therefore, the choice of an appropriate catalyst depends on the intended molding or curing temperature. Benzoyl peroxide starts to decompose at 50°C and is therefore used for resins which are cured at high temperatures. Methylethyl ketone peroxide is used at lower temperatures especially with a cobalt accelerator such as cobalt naphthenate. Table I taken from *Polyesters and their Applications*, Bjorksten Research Laboratories, Inc., Reinhold Publishing Corp., New York, 1956, p 49 lists commonly used peroxide catalysts.

TABLE I

| Trade Name | Composition | Physical form | Peroxide assay % | Supplier* |
|---|---|---|---|---|
|  | Benzoyl peroxide | granules | 96 | 2 |
|  | Benzoyl peroxide | fine granules | 96 | 2 |
|  | Benzoyl peroxide purified | fine crystals | 96 | 2 |
| LUCIDOL | Benzoyl peroxide | fine crystals | 96 | 1 |
| LUPERCO ATC | Benzoyl peroxide compounded with tricresyl phosphate | thick paste | 50 | 1 |
| CADOX BTP | Benzoyl peroxide compounded with tricresyl phosphate | thick paste | 50 | 2 |
| LUPERCO CDB | 2,4-Dichlorobenzoyl peroxide compounded with dibutyl phthalate | thick paste | 50 | 1 |
| LUPERSOL DDM | Methylethyl ketone peroxide in dimethyl phthalate | liquid | 60 | 1 |
| CADON MDP | Methylethyl ketone peroxide in dimethyl phthalate | liquid | 60 | 2 |
|  | Cyclohexanone peroxide (mixed ketone peroxides) | granules | 96 | 1 |
| LUPERCO JDB | Cyclohexanone peroxide compounded with dibutyl phthalate | thick paste | 50 | 1 |
|  | Cumene hydroperoxide | liquid | 73 (as hydroperoxide) | 3 |

*Supplier: (1) Lucidol Div., Wallace and Tiernan, Inc., Buffalo, N.Y.
(2) McKesson and Robbins, Inc., Chem. Div., N.Y. (distributors for Cadet Chem. Corp., Buffalo, N.Y.)
(3) Hercules Powder Co., Nav. Stores Dept., Wilmington, Del.

Other peroxide catalysts mentioned in the polyester patent literature are bis(para-bromobenzoyl) peroxide, bis(phthalyl) peroxide, bis(para-chlorobenzoyl) peroxide, bis(succinyl) peroxide, acetylbenzoyl peroxide, bis(chloroacetyl) peroxide, bis(acetyl) peroxide, tertiary-butyl perbenzoate, tertiary-butyl hydroperoxide, bis(dichlorobenzoyl) peroxide, oxonides such as di-isopropylene oxonide and di-isobytylene oxonide, peracetic acid, perbenzoic acid, benzoyl peracetate, and peroxycarbonates such as ethyl peroxydicarbonate.

Accelerators other than cobalt napthenate may be used as well. Among these are the vanadium accelerators and dimethyl-p-toluidine. Other catalysts such as dimethylaniline may be used as well. When using these accelerators and catalysts to promote cross-linking the polyester resin, it may be beneficial to heat the resin. The temperature at which to heat the resin is dependent upon the curing system being employed and is well within the skill of the art.

In order to more fully illustrate the invention the following examples are presented. The purpose of the examples is to illustrate the fire retardancy characteristics obtained by adding the alkoxy derivatives of this invention to a general purpose polyester resin that is often used to make comparisons with other complex polyester resins. Therefore, the use herein of the general purpose polyester resin is meant to be illustrative and not a limitation as to the scope of the invention.

EXAMPLE I

Phosphorus pentachloride, 20.85g, was dissolved in 200 ml of benzene and aniline, 9.3g, was added slowly. The reaction mixture was heated slowly to the reflux temperature, 80°C, and HCl (g) was slowly evolved during a three hour heating period. The product, a solid, precipitated from the reaction mixture. Filtration produced 17.5g of white crystals, m.p. 180°C, for a yield of 77%.

The product, 11.9g, was then heated in 200 ml of $CCl_4$ with ethanol, 6.9g until the former had dissolved and then for an additional six hours during which time HCl evolution was observed. The product, isolated by distilling the solvent and volatile byproducts, weighed 9.1g for a yield of 71%. An infrared spectrum of this product showed the presence of POC bonds, the PN four-membered ring structure and P=O bonds.

EXAMPLE II

Using essentially the same technique described in Example I with 2,2,2-trichloroethanol, 22.7g, a viscous liquid residue was produced after distillation up to 115°C at 0.05 mm Hg. This product weighed 22.2g for a yield of 77%. Its infrared spectrum was very similar to that obtained in Example I.

EXAMPLE III

Using essentially the same technique described in Example I with 1,3-dichloro-2-propanol, 20.0g, a viscous liquid residue was produced after distilling to 108°C/0.05 mm Hg. This product weighed 16.1g.

EXAMPLE IV

Using essentially the same technique described in Example I with 2,3-dibromopropanol a residue after distilling to 118°C at 0.05 mm Hg was produced. This product, a viscous orange-brown liquid, had an infrared spectrum that was similar to those obtained when using other alcohols.

EXAMPLE V

Ten parts of the additive described in Example I were mixed with 90 parts of a general purpose polyester resin (GR-941 — Marco Chemical Division of W. R. Grace & Co.) and this mixture was then cured by the addition of 0.02 parts of cobalt naphthenate, and 0.1 parts of methylethylketone peroxide and then heated at 70°C for four hours. The resin had a Barcol hardness of 38 and an oxygen index of 0.235.

EXAMPLE VI

A resin produced in the manner described in Example V from the additive described in Example II had a Barcol hardness of 35 and an oxygen index of 0.252.

EXAMPLE VII

A resin produced in the manner described in Example V from the additive described in Example III had a Barcol hardness of 40 and an oxygen index of 0.245.

EXAMPLE VIII

A resin produced in the manner described in Example V from the additive described in Example IV had a Barcol hardness of 40 and an oxygen index of 0.252.

EXAMPLE IX

Phorphorus pentachloride, 20.85g, was reacted with allyamine, 5.7g, in 200 ml of carbon tetrachloride. Upon addition of the amine the temperature rose from 23°C to 45°C. The reaction mixture was heated for 16 hours until the evolution of HCl was complete. The product, isolated by distilling the solvent, was a clear yellow-colored liquid. Its infrared spectrum was similar to that obtained for trichlorophosphineimine except the bonds due to the phenyl group were replaced by bonds expected for allyl containing structures.

EXAMPLE X

Ethanol, 13.8g, was added to the product from Example IX, 19.25g, dissolved in 150 ml of carbon tetrachloride. This reaction was exothermic and evolution of HCl was noted. The product, a viscous, clear yellow liquid, weighed 13.35g for a yield of 60%. Its infrared spectrum was appropriate for the proposed structure.

EXAMPLE XI 2,3-dibromopropanol, 65.4g, was added to the product from Example IX in 200 ml of carbon tetrachloride. This addition caused the reaction temperature to rise from 23°C to 49°C. The reaction mixture was heated to 75°C for two hours, then stirred overnight without heating. During this reaction period there was a gentle evolution of HCl. The product was isolated by distillation of the solvent and a small amount of unreacted alcohol. The infrared spectrum was similar to that observed for Example X.

EXAMPLE XII

A resin was prepared, containing 90 parts of a general purpose polyester resin (GR-941 — Marco Chemical Division of W. R. Grace & Co.) and 10 parts of the additive described in Example XI. Curing of this resin was effected by addition of 0.02 parts of cobalt naphthenate and 0.1 parts of a methylethylketone peroxide, and then heating at 50°C for two hours at 70°C for four hours. The resin had a Barcol hardness of 38 and an oxygen index of 0.245.

EXAMPLE XIII

Using the additive described in Example XI and the technique described in Example XIII, we prepared a resin with a Barcol hardness of 41 and an oxygen index of 0.253.

Example I illustrates the manner in which the adduct of phosphorus pentachloride and aniline. Examples I–IV illustrate the production of different alkoxy derivatives of the adduct of Example I. The treatment of a general purpose polyester with the alkoxy derivatives of Examples I–IV is described. Example IX illustrates the preparation of the adduct of phosphorus pentachloride and allylamine. Examples X and XI show the preparation of two different alkoxy derivatives of the adduct of Example IX. Treating a resin with the alkoxy derivatives of Examples X and XI is shown in Examples XII and XIII.

In the examples the oxygen index was obtained by using the method disclosed under ASTM D-2863-70. By "oxygen index" is meant the minimum oxygen concentration, expressed in volume percent, in a mixture of oxygen and nitrogen that will just support combustion of a material under the conditions of the method. Accordingly, a material having a high oxygen index requires more oxygen to support combustion, and is therefore more fire retardant then are having a low oxygen index. In each of the examples the additive enhanced the fire retardation capabilities of the polyester resin.

The polyester resin used in the examples has an oxygen index of .18. It is apparent that the use of the additive of the invention significantly increases the fire retardancy of the resin.

Obviously many modification and variations of the present invention are possible in light of the above teachings. It is therefore to be understood that within the scope of the appended claims the invention may be practiced otherwise than as specifically described.

What is claimed is and desired to be secured by letters patent of the United States is:

1. A method of enhancing the fire retardancy characteristic of general purpose unsaturated polyester resins, which comprises:
   reacting an alcohol with an adduct selected from the class consisting of the equimolar adduct of phosphorus pentachloride and aniline and the equimolar adduct of phosphorus pentachloride and allylamine, in an alcohol-to-$PCl_5$ mole ratio of 3:1, to form an alkoxy derivative; and
   adding said alkoxy derivative to said polyester resin in an amount from about 5 to about 20 weight percent of the total combined weight.

2. The method of claim 1 wherein said alcohol is selected from the group consisting of $\beta$-chloroethanol, 3,3,3-trichloropropanol, 1,3-dichloro-2-propanol, 2,3-dibromopropanol and 2,2,2-trichloroethanol.

3. The method of claim 1 wherein a catalyst is added to polymerize said resin.

4. The method of claim 3 wherein heat is added to said resin.

5. The fire retardancy enhanced polyester resin of claim 1.

6. The fire retardancy enhanced polyester resin of claim 2.

7. The method of claim 2 wherein said adduct is the equimolar adduct of phosphorus pentachloride and aniline.

8. The method of claim 2 wherein said adduct is the equimolar adduct of phosphorus pentachloride and allylamine.

9. The fire retardancy enhanced polyester resin of claim 8.

10. The fire retardancy enhanced polyester resin of claim 9.

* * * * *